Figure 4:
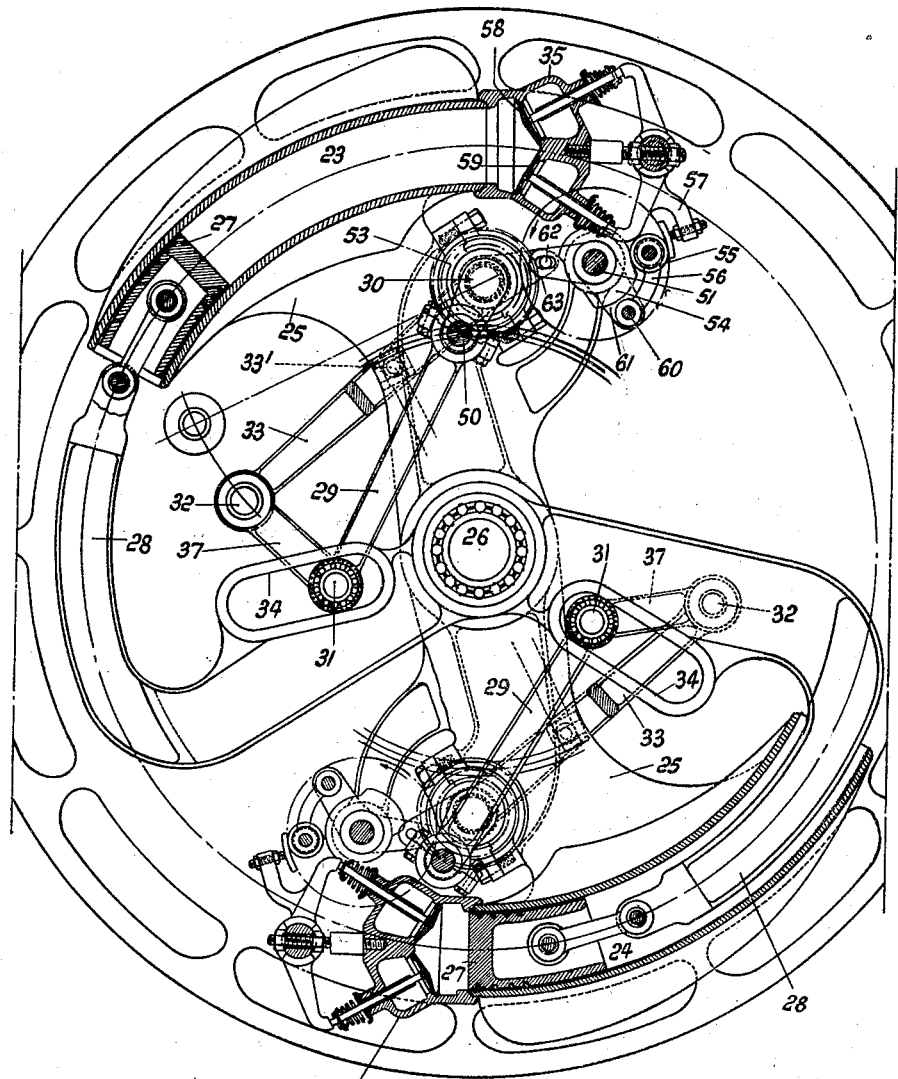

May 31, 1932.   G. E. EZBELENT   1,860,707
ROTARY INTERNAL COMBUSTION ENGINE
Filed April 27, 1929   5 Sheets-Sheet 1
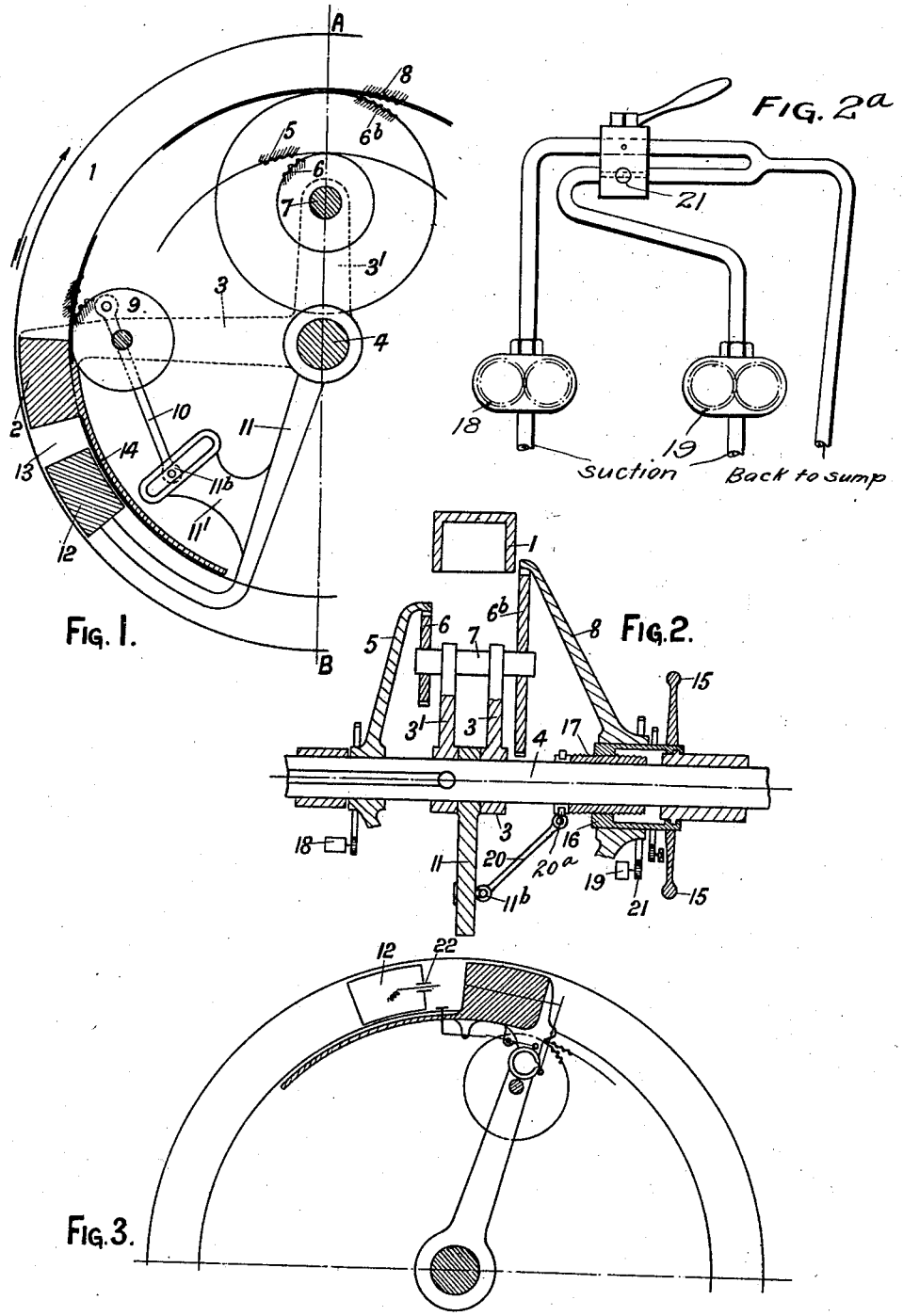

May 31, 1932.  G. E. EZBELENT  1,860,707
ROTARY INTERNAL COMBUSTION ENGINE
Filed April 27, 1929   5 Sheets-Sheet 4

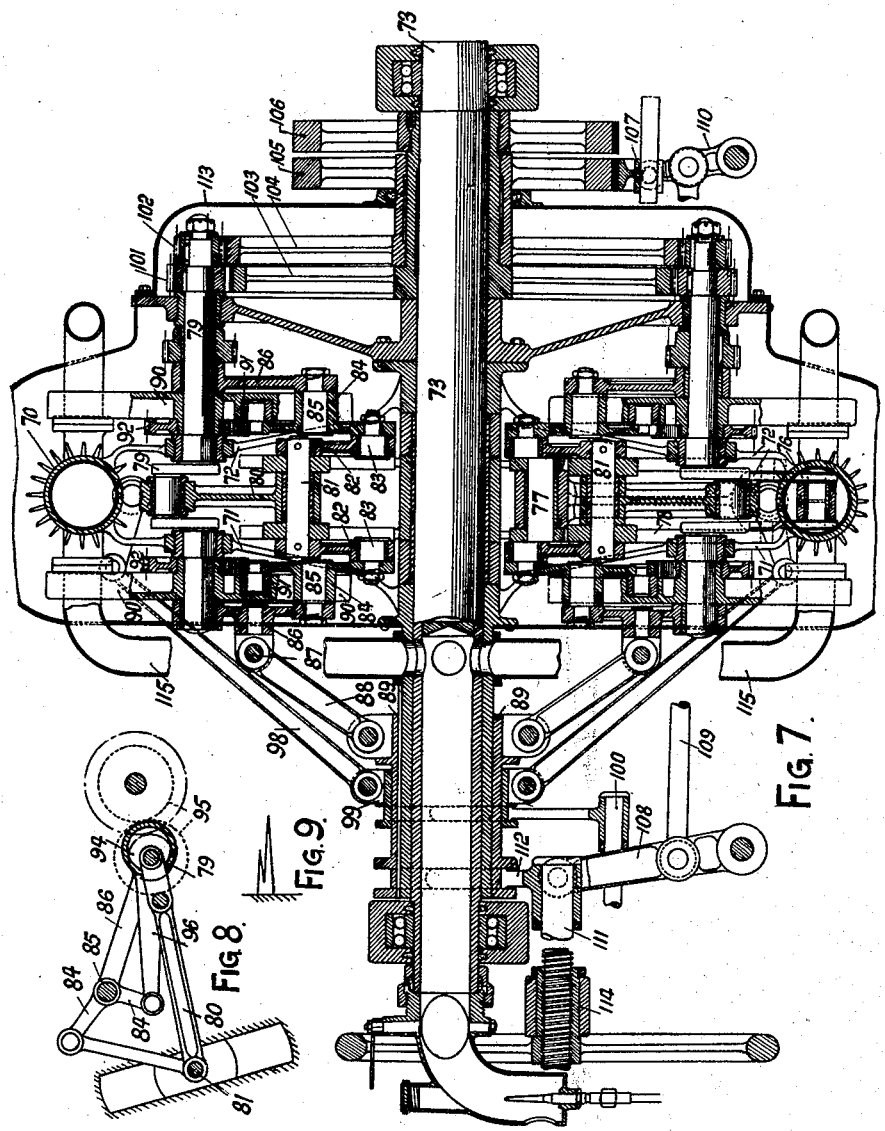

Patented May 31, 1932

1,860,707

UNITED STATES PATENT OFFICE

GEORGES EUGENE EZBELENT, OF PARIS, FRANCE

ROTARY INTERNAL COMBUSTION ENGINE

Application filed April 27, 1929, Serial No. 358,447, and in Great Britain May 10, 1928.

The subject of the present invention is a rotary engine having one or more groups of power units each including a cylinder which may be a right cylinder, an arcuate chamber of circular section or a part of a torus adapted to rotate relatively to a central driving shaft in which cylinder moves a piston serving to produce a working cycle similar to that of the ordinary internal combustion engine.

A feature of the present invention is that the number of explosions per revolution of the driving shaft may be varied. As a result the engines may be run at a given speed and for this speed a smaller or larger number of impulses for a given torque may be produced.

A further feature resides in this that certain factors may be varied such as the compression ratio, the advance of the inlet and the automatic retardal of the exhaust so as to obtain with a certain regime a variable speed and a variable output.

In accordance with a further feature of the invention the speed of the engine may be varied without alteration of the throttle opening or interference with the flow of the gas so that the column of gas passes to and through the inlet ports without being retarded as in an ordinary engine. A considerable economy in fuel results.

With an engine of small dimensions there may be admitted per revolution of the engine a much greater volume of gas than can be supplied to the usual engine. Whereas in the ordinary engine there would be required say four cylinders, eight valves and four sparking plugs the same effect may be obtained by the present engine with only one cylinder, one piston two valves and one sparking plug.

In accordance with a further feature there is obtained, inter alia, variation in the compression ratio, either automatically, according to the length of stroke used or at will, without altering the stroke so as to obtain always the most favourable working conditions according to atmospheric conditions at any moment. For instance, in the case of an aeroplane it would be possible to run the engine with a given compression ratio at the lower altitudes and to increase this when a greater height is reached or if the barometric pressure fell considerably.

Still another important feature of the invention resides in the ability to obtain strokes of unequal length in one cycle while maintaining, if desired, the four uneven strokes of one cycle in the same ratio in other words maintaining the strokes "homothetic" irrespective of the length of any of them. Thus the inlet stroke may start from a point as near the cylinder head as possible and the compression stroke terminate at a distance from the cylinder head such as to give the desired compression ratio. The expansion or working stroke may be longer so as to utilize better the expansive force of the gases and lastly the exhaust or scavenging stroke may be the longest and return the piston to its starting point. With each variation of the stroke there will be obtained an appropriate variation of the compression ratio.

In one construction in accordance with the invention the variation of the strokes and the inequality of the strokes in the four strokes of a cycle is obtained by the displacement at each stroke of a point at which a connecting rod acts in a slot or slide, the point being displaced by a system of eccentrics or cams rotating at half the speed of the actuating crank shaft and the amplitudes imparted by the cams being varied and corrected by an appropriate system of links and/or by the shape or the angle of the slot in relation to a radius from the centre of the driving shaft.

In accordance with a still further feature of the invention a combination of levers, links, etc. permits of utilizing directly and not only by reaction the forces exerted on the piston giving a couple on the crank shaft whereby the forces exerted on the cylinder head and on the piston face are both directly used to drive the system forward.

Figure 5:
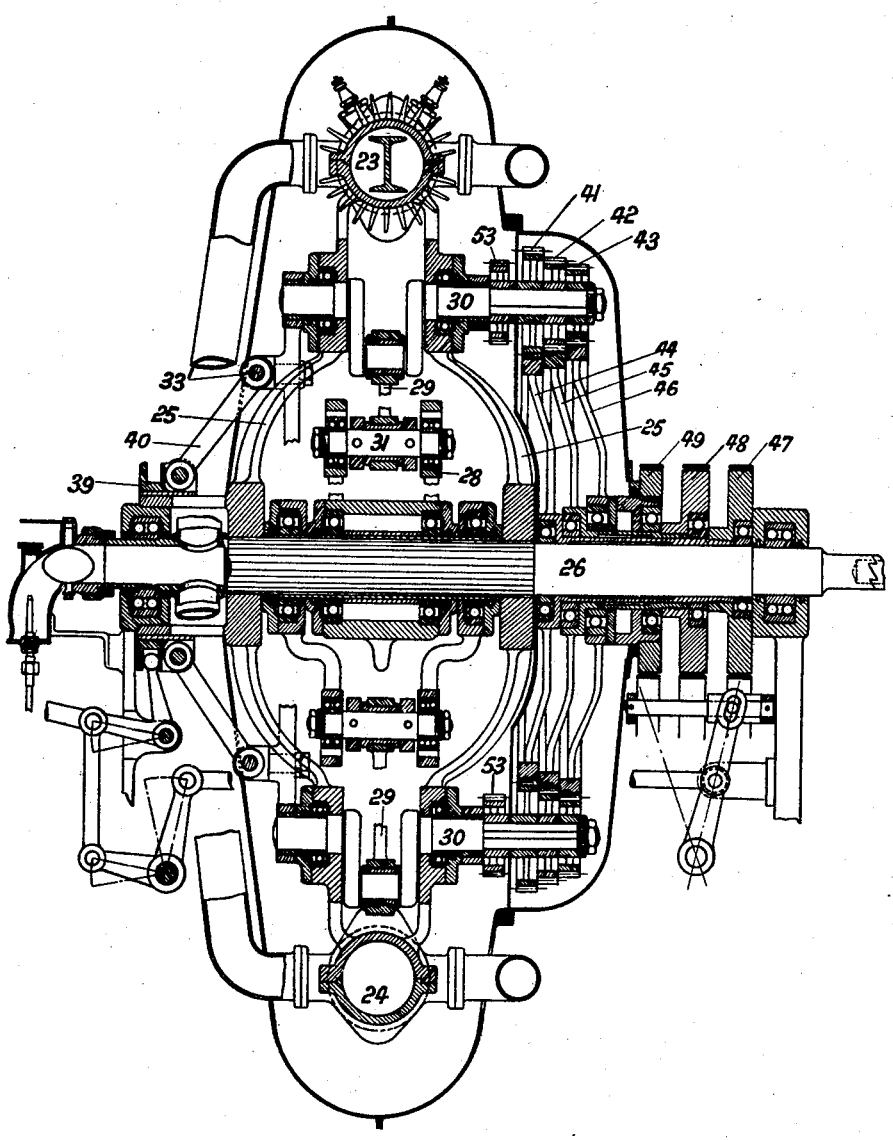
Figure 6:
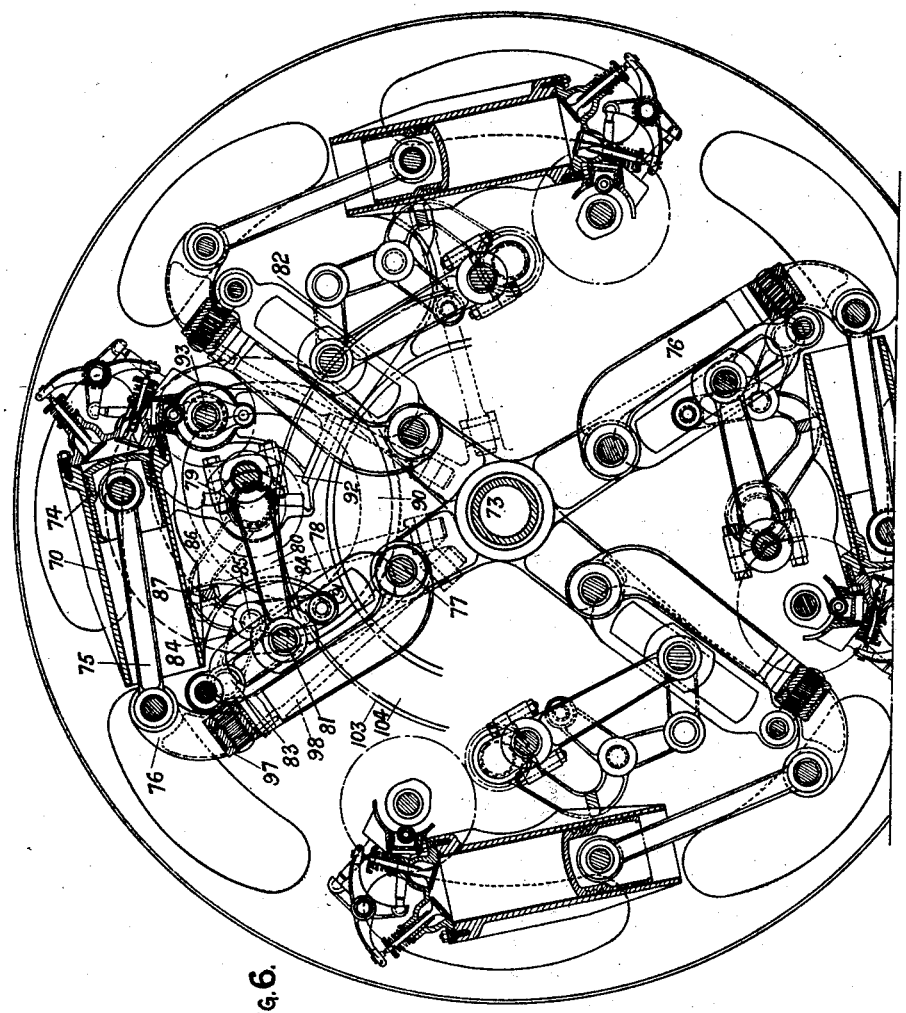

In the accompanying drawings Figs. 1–3 are more or less diagrammatic views illustrating the principle of the invention, Fig. 2 being a section on the line A—B of Fig. 1 and Fig. 2A being a diagram illustrative of the differential braking system; Fig. 4 is a transverse section through a two cylinder engine constructed in accordance with the invention and Fig. 5 is an axial section thereof; Fig. 6 is a transverse section of a four cylinder engine constructed in accordance with the invention and Fig. 7 an axial section thereof; Fig. 8 is a detail view showing an alternative means for displacing the slide and Fig. 9 a diagram illustrative of the variation in strokes of a cycle obtainable with the engine.

Referring to Figs. 1, 2 and 3, 1 denotes a circular chamber or cylinder of appropriate section, shown square, but which might obviously be made of any other section, open on one side, and in which is adapted to move a piston 2 in the direction of the arrow (Fig. 1). This piston is connected by an arm 3 to shaft 4 on which it is fast. On shaft 4 is loosely mounted an internally toothed wheel 5 which meshes with a pinion 6. This pinion 6 is fast on a shaft 7 on which is also mounted a pinion 6b which meshes with another internally toothed wheel 8. Fig. 2 shows the arrangement of the gears referred to. The shaft 7 and the pinions 6 and 6b are carried by an arm 3' which in Fig. 1 is shown at right angles to the arm 3 only for the sake of clearness of the drawings and could with advantage be placed elsewhere.

On the arm 3 is carried a pinion 9 (Figs. 1 and 3) meshing with the internally toothed wheel 8.

The axle of pinion 9 is suitably in the form of a cranked shaft supported by a pair of arms 3 only one of which is shown. The eccentric part of the cranked shaft is connected by a connecting rod 10 to a point 11b on an extension 11' of arm 11; the arm 11 carries at its outer extremity the cylinder head 12 co-operating with the piston 2 and is loosely mounted on shaft 4.

The pinion 9 imparts an alternating motion to the rod 10 resulting in an intermittent forward motion of the extension 11', arm 11 and head 12 which are all solid.

The point 11b can be moved along a slide as shown in the arm 11 and can be fixed at any point of the slide so as to modify more or less the amplitude of the intermittent motion imparted to the cylinder head when piston 2 travelling around the chamber 1 causes pinion 9 meshing with the toothed wheel 8 to rotate around its axis.

The movable cylinder head is constructed, as will be hereinafter explained, so that it can only move in the direction of the piston and not otherwise.

The space 13 between the piston 2 and the head 12 forms the working chamber and is suitably kept closed by an arcuate extension 14 of the piston 2, the extension being of such length that chamber 13 will always be closed even with the piston 2 and head 12 at their maximum distance apart.

It is possible to apply a differential braking effect to the hypocyclic system formed by the gears 5, 6, 6b, and 8, on the gear 5 and/or on the gear 8. This braking action is differential inasmuch that with a greater braking action on one member there will correspond a proportionate freeing of the other and vice versa.

The pinions 9, 6 and 6b following a circular path with the piston and meshing with gears 8 and 5 turn at speeds which will be proportionate to the amount of the differential braking applied to gear 5 and/or 8. It is obvious that the greater the braking effect applied to gear 8—which will of course release 5—the slower will pinion 9 turn and vice versa.

This braking action will be regulated so that pinion 9 will make half a revolution for one phase of the four stroke cycle i. e. will make two complete revolutions for one complete four stroke cycle.

Simultaneously with any change in the intensity of the braking effect applied, point 11b will be displaced to such a position that the alternating motion of the connecting rod 10 will impart to the extension 11 and thereby to the head 12 an intermittent motion equal to double the stroke of one phase.

It will therefore be possible with a strong braking action applied to wheel 5 and by displacing the point 11b from the center of the slide to cause pinion 9 to rotate quickly on its own axis and to impart to the head 12 an intermittent motion of greater frequency and smaller amplitude. A greater number of impulses of short stroke for one complete rotation of the piston and shaft will result.

Inversely by bringing the point 11b nearer to the center of the slide and by applying a strong braking effect to gear 8, thereby freeing gear 5, pinion 9 will turn more slowly and the connecting rod 10 will impart a less frequent movement to 11 and 12 but this movement will be of greater amplitude, so as to follow the piston. Fewer impulses for one rotation but with a correspondingly longer stroke will result.

The differential braking effect may be applied in several ways. One of these indicated by way of example in Fig. 2 consists in regulating the flow of oil or other suitable fluid from two independent appropriate pumps 18 and 19 respectively, one 18 of which is driven by gear 5 the other 19 of which is driven by gear 8, a double valve with a single control checking the flow of fluid of the one while permitting an increase in the flow of the other and vice versa.

As shown in Fig. 2 by way of example the point 11b may be displaced by operation of a hand wheel 15 which in conjunction with an internally threaded sleeve 16 serves to displace a screw 17 along the shaft 4.

By turning the hand wheel 15 the screw 17 will be displaced laterally and will move the point 11b through link 20 and will bring the point 20a nearer to the boss 3 or further from it thereby displacing the end 11b of the link 20 up or down in the slot carried by the extension of the arm 11 and simultaneously control a dual valve 21 so arranged that when one valve opens the other closes. As indicated in Fig. 2A the dual control valve 21 has one port open and the other closed. By turning the handle one port closes as the other opens. For safety purposes a bypass is provided by which the fluid returns to the sump after passing through the dual valve.

Admission and exhaust will be through valves positively operated by a cam turning at half the speed of gear 9, and by rockers etc. The inlet valve may be conveniently placed in the piston itself and the exhaust in the piston extension near the piston. Fig. 3 shows diagrammatically how the valve gearing may be arranged and ignition provided.

Ignition may be effected by a plug or plugs 22 of known type placed in an appropriate position e. g. in the head 12, the spark being controlled by cam and contact breaker or by mere contact of two appropriate points between the head 12 and piston 2 and/or by battery and coil or otherwise.

The force of the explosion will tend to separate the piston and the head but by preventing the head moving away from the piston in an opposite direction by means such as hereinafter mentioned, the force of the explosion and force of the expansion of the burning gases will drive the piston round the shaft 4. One means for preventing the head 12 from moving in an opposite direction consists in providing the head with a rearwardly extending arm which when the head tends to move in the direction away from the piston forces apart two short links and forces braking surfaces against the walls of the circular chamber. In lieu thereof extending segments may be used or a ratchet, wedge, or other similar means.

It will be clear from the foregoing that it will be possible to vary the extent of the working stroke or the use made of the expansive force of the gases, as also to change the number of impulses given to a piston for one complete revolution around the circular chamber as a result of which the power output for various speeds can be changed. As the number of impulses given can be very finely adjusted it follows that the explosions will not occur at the same place in the circular chamber; by using more than one piston and setting them so that one charge will be about to be ignited while the other is expanding, the impulses will overlap and a very even torque will be obtained.

The "régime" of the engine and its power output at varying speeds might be changed also by displacing point 11b without altering the braking effect, the compression ration being altered.

Referring now to the embodiment shown in Figs. 4 and 5 there is shown only one group of power units but obviously a number of juxtaposed groups may be provided with their working strokes overlapping so as to produce a continuous torque on the driving shaft. Two cylinders per group of power units are shown, an upper at the end of its expansion stroke and a lower at the end of the compression stroke. Any number of cylinders might however be employed per group while the working of explosion strokes could be simultaneously or otherwise.

Referring to the said drawing, the engine comprises a cylinder 23 diametrically opposite which and symmetrically disposed with respect to which for balancing purposes is provided a cylinder 24. These two cylinders are connected with each other by two cheeks 25 made fast at their central part to the driving shaft 26.

A piston 27 held by an arm 28 loose on the driving shaft may be moved within the cylinder by means of a connecting rod 29 and crank shaft 30. This crank shaft 30 rotates between the two cheeks 25.

A complete revolution of the crank shaft 50 will pull towards it the connecting rod 29 and the arm 28 in one half revolution and in the other half revolution will push away the connecting rod and the arm i. e. will effect reciprocation of the piston in the cylinder if it be assumed for the purpose of explanation that the cylinder is fixed.

But the end 31 of the connecting rod 29 is constrained to rock about a pivot 32 carried by a connecting rod 33. If the latter be considered as fixed in a certain position the end 31 controlled by the connecting rod 29 will cause the arm 28 to describe reciprocating movements of a certain amplitude. In another position of the connecting rod 33, the pivot 32 being raised for example, the end 31 acting on the arm 28 through a larger radius will cause the latter to describe movements of smaller amplitude. Thus the raising or lowering of the pivot 32 has for effect to produce greater or smaller reciprocating movements of the piston and consequently to utilize a greater or smaller part of the expansion and to make this variable.

The end 31 is constrained to move in a slot 34 in the arm 28. The form given to this slot is such that as the end 31 is raised to produce smaller amplitudes of movement of the arm 28, the latter moves the cylinder head 35 towards or from the head of the piston 27 in its forward stroke which has for its effect to increase or reduce the dimensions of the compression chamber. In other words if the piston be considered at the end of its stroke with the head of the piston adjacent the cylinder head and the connecting rod 33 be displaced or the pivot 32 and axis 31 through the medium of the link 37 the slot 34 is so formed that it causes the piston to move away from or approach the cylinder head and thus produces a variation in volume in the compression chamber. Moreover, this variation is smaller or larger than the proportionate variation in cubic capacity which would give the same compression ratio and it is therefore possible to obtain a variation in compression ratio for any given régime of the engine.

The various changes of position of the connecting rod 33 are obtained in the construction shown through the medium of a collar which may be displaced laterally and carries small links which may act on the connecting rod 33 at the point 33' (Fig. 5). The displacement of the collar 39 will push or pull the links 40 and vary the inclination of the connecting rod 33; the arrangement is referred to only by way of example. There might be employed a screw threaded ring screwing on a fixed sleeve and having an arrangement of links and pivots identical with that described above; or the various changes of position of the connecting rod 11 might be effected by any other known device.

On the crank shaft 30 are keyed pinions 41, 42, 43, which are provided with different numbers of teeth and which mesh with other pinions, 44, 45, 46, loose on the driving shaft thus forming epicycloidal trains. The pinions 44, 45, 46 are fitted with brake drums 47, 48, 49, and may be held fixed or may be freed by steel brake bands, brake shoes by oil brakes or in another way.

The locking of any one of the pinions 44, 45, 46, causes one of the pinions 41, 42, 43 to roll on the corresponding locked pinion. This pinion in one complete revolution or in one rotation of the driving shaft will thus have made a certain number of revolutions. The number of revolutions made by each of the pinions, 41, 42, 43, will differ according as one or the other of the pinions 44, 45, 46 is held fixed.

In Fig. 5 are shown three pinions engaging other three pinions. Any number of pinions however may be employed.

If the whole of the cylinder block be considered as rotating about the driving shaft 26, the pinion 41 for example rolling round the pinion 44, it is easy to see that the crank shaft 30 will pull the arm 28 during one half revolution and will leave it stationary during the other half revolution and this for a given number of times per revolution of the cylinder or of the driving shaft, the number in question being a ratio of the epicycloidal train used.

If however while the whole unit turns and when the piston head 27 is near the cylinder head 35 a spark is produced after the introduction of a gaseous mixture the resulting explosion will drive away the cylinder head and increase the movement of rotation; if the spark and explosion are produced at the moment when the point 50 of the crank shaft 30 is in its position of maximum eccentricity in relation to the engine shaft i. e. in a position which is that of the upper dead center, the explosion which should have for its effect to move away the head of the piston but in the opposite direction, will exert through the arm 28 and the connecting rod 29 a traction at the point 50 on the crank shaft 30 to increase the movement of rotation of this shaft in consequence of the pinion 41 using as a fulcrum the fixed pinion 44, 45 or 46 of the whole cylinder block. In the present instance as distinguished from an engine of ordinary type the impulses exerted on the piston head and cylinder head will both contribute to the rotation of the cylinder block and of the driving shaft.

There is of course a direct relation between the various amplitudes of movement of the arm 28 and/or in the variation in the expansion and the number of revolutions made by the crank shaft 30 in one revolution of the driving shaft. According to the various positions occupied by the connecting rod 33 and according to which toothed pinions 44, 45, 46 is held fixed, the engine will run with a variable number of explosions per revolution of the driving shaft.

The interconnection of the locking of one of the pinions 44, 45, 46 and the various positions occupied by the connecting rod 33 can be realized as in Fig. 5 by means of links; or if a screw threaded ring is employed as previously suggested for moving the connecting rod 33, this ring in a certain position may operate an oil brake acting on one of the pinions 44, 45, 46; in another position it may operate another oil brake on another pinion 44, 45, 46 and so on.

A cam shaft 51 rotating between the two cheeks of the cylinder block has keyed thereon a pinion 52 which is always in mesh with a pinion 53 fixed on the crank shaft 30. This shaft 51 has a contact breaker operating in conjunction with a magneto, coil ignition or other known electric current producing means. When the piston head and the cylinder head approach one another and at a certain moment of the cycle of the engine the interruption of current produced by this device generates the spark necessary to ignite the explosive mixture at one or two sparking plugs mounted in the cylinder head or piston as indicated in Fig. 5. The method of obtaining ignition is one of a number which may be used. For instance two contacts might be used, one on the cylinder block the other on the arm 28, which contacts would interrupt a current from a known electric apparatus such as a magneto, a coil and accumulators, when the piston approaches the cylinder head and produce the necessary spark at the plug.

This shaft 51 is also fitted with inlet and exhaust valve cams. In Fig. 4 the valves are shown as being operated by means of rockers. A cam 54 operates a roller 55 carried by a lever 56, this roller 55 in turn rocks a rocker 57 which operates the inlet and exhaust valves 58, 59. The roller carrying lever 56 pivots about spindle 60 carried by a lever 61 which is loose on the cam shaft 51. This lever 61 is moreover actuated by a pivot 62 fixed on an extension 63 of the connecting rod 33. When the latter is moved into different positions to produce variations in expansion and also variations in the number of explosions, by the arrangement just described the position of the roller 55 is varied in relation to its operating cam.

Thus by giving a suitable shape to the slot in the lever 61 at the pivot 62 a variation in the timing of the valves may be effected which in conjunction with the other means described will have the direct effect of increasing or reducing the speed of the engine and of altering the timing to suit such speed.

Any arrangement other than that described might be employed. For example there could be employed two cams, one operating the inlet valve and the other the exhaust valve, two connecting rods 56 carrying two rollers 55 actuating the two valve levers. The extension 63 would rock two levers 61 carrying two spindles 60 in which would turn the two connecting rods 56, the one in the one direction to produce earlier opening of the inlet valve and the other in the opposite direction, by means of a suitable device, to delay the closing of the exhaust valve, the arrangement acting to modify the timing of the valves while utilizing a given expansion, a given compression ratio, a given number of explosions with a certain regime of the engine so as to obtain a variable speed and variable power without altering the throttle.

Means may be provided for moving the end 31 of the connecting rod 29 during the various phases of one working cycle so as to have unequal strokes for instance a short suction stroke normal compression, a long expansion and a long scavenging stroke. This means may consist of a cam mounted on the shaft 51 and acting on the connecting rod 29, the slot 34 being given an appropriate form for this purpose.

In the embodiment illustrated in Figs. 6–9 the engine is a four cylinder engine but it is obvious that the engine may have any number of cylinders consistent with proper balance and with the space available. In the following description one power unit only is considered and described.

Referring to Figs. 6 and 7 of the drawings 70 indicates one of the cylinders which are mounted fast on cheeks or flanges 71 and 72 mounted on a sleeve which is solid with the driving shaft 73. In the cylinder 70 moves a piston 74 which is connected by a connecting rod 75 to a piston arm 76 which is pivoted on an axle 77 connecting the piston arms and arms 78 formed with slots. 79 indicates the crank shaft and 80 the connecting rod the remote end of which is pivoted about a pin 81 movable in the slot in the arms 78 by means of rocking links 82 pivoting at 83 about V-shaped links 84 which serve as hereinafter described to displace the pin 81 and thus to vary the stroke of the piston. The pivot 85 of the V-shaped links 84 is connected to a lever 86 for changing the regime of the engine which lever is connected at 87 to levers 88 carried on a sleeve 89 on the hollow driving shaft 73 and movable as hereinafter explained. 90 are cams or eccentrics mounted on the crank shaft 79 and used for varying the different strokes of the cycle, which cams are tracked by rollers 91 on the V-shaped links 84. The cams 90 are driven at the speed of the cam shaft which is half the speed of the crank shaft by means of pinions 92 mounted thereon and driven from the cam shaft 93.

In the modification illustrated diagrammatically in Fig. 8 there is shown an arrangement in which the cam 90 is replaced by an eccentric. As shown, the eccentric 94 is loosely mounted on the crank shaft 79 and is driven by pinions 95 at the speed of the cam shaft i. e. at half the crank shaft speed. A sheave on the eccentric 94 acts through a connecting rod 96 on the V-shaped levers 84.

The compression ratio is altered by alteration of the angle of piston carrying arms 76 with the slot by means of a nut 97 which is rotatable by lever 98 which is carried on a collar 99 movable by external controlling means indicated at 100 by hand or otherwise.

In order to vary the number of explosions per revolution of the engine there are provided on the crank shaft 79, two or more pinions 101 and 102 meshing with pinions 103 and 104 carried on sleeves on the driving shaft 73 and solid respectively with brake pulleys 105 or 106 either of which is adapted to be braked by means of a brake shoe 107 movable by means of a link 108, rod 109 and link 110 by a spindle 111 operable by a hand wheel which for the sake of convenience is shown in the drawings displaced from its usual position. This spindle 111 serves to operate through a fork 112, the collar 89 and through the link 88 and lever 86 to alter the position of the pivot 85 and hence the position of the axle 81 so as to increase or reduce the lengths of the strokes and consequently the number of explosions per revolution of the engine. The gear wheels 103, 104 are suitably enclosed and separated from the other mechanism by means of a casing 113.

For the purpose of explanation of the operation of the engine it will be assumed that the system is first rotated by external means, hand or starter or the like. Cylinder 70 moves forward. One of the pinions 101 or 102 fixed at the end of the crank shaft 79 and gearing with pinions 103 or 104 (Fig. 7), one of which is free while the other is held stationary by braking means as described and shown, or otherwise, will turn and rotate crank shaft 79 which in turn by this rotation will leave the piston behind in relation to the cylinder. This will make a phase or stroke which may be assumed to be the inlet or suction stroke. Towards the end of that stroke point 81 will be raised by the cam 90 or eccentric, V-shaped levers 84 and link 82. After another half revolution of the shaft 79 the whole system still moving forward and the pinions still rolling on that one of the pinions 103 or 104 which is stationary, the crank 79 will bring the piston 74 forward at an accelerated speed in the cylinder 70, but point 81 having been raised the amplitude of this stroke will be less than that of the inlet stroke so as to leave the necessary space for compression. At a point near dead center a sparking plug of the known type will ignite the mixture producing the expansion or working stroke. During this stroke, however, the cam 90 or the eccentric, through the same means as before will cause point 81 to move towards the axis of the engine thereby increasing the amplitude of the relative motion between cylinder and piston thus giving an extended expansion stroke. After a further half revolution of the crank shaft 79, and point 81 having been brought back to its original position, the piston 74 will be brought back to its starting point and will evacuate almost the whole of the burnt gases. The same cycle of operations will then be repeated.

Owing to the fact that point 81 is moved towards the axis during the expansion stroke it will be possible for the piston to have a movement backwards which through the medium of connecting rod 80 will exert a pull or traction on the crank pin shaft 79 thus creating a couple as a result of which both the force exerted on the cylinder head and that on the piston will be directly used to drive the system forward.

While working at a given number of impulses per revolution of the driving shaft 73 (which number is determined by the diameter of pinions 103, 104 and others if more than two are used and the diameter of the pinions meshing with them) the point 85 will be a fixed point.

When it is desired to change the number of explosions and therefore the stroke or length of the stroke, one of the pinions 103, 104 etc. will be freed and another one will be selectively braked as shown in Fig. 7 by direct braking or by differential braking as described with reference to Figs. 1-3, and simultaneously point 81 will be displaced in the guide slot. This will be realized by operating suitable gear shown by way of example in Fig. 7 rotation of a hand wheel causing an internally threaded sleeve 114 acting on a screw 111 and through a rod link 108, rod 109 on brake shoe 107—the hand wheel acting also at the same time on a collar and fork system 112, a link 88, a pivot 87 and V-shaped lever which pivoting freely on 79 will displace point 85 which acting on V-shaped links 84 will move point 81 in the slot on to another point in the slot.

At this new point, or at any other point of the slot, the cam 90 acting through levers 84 pivoted at 85 will always displace point 81 without altering the point 85 and thus realize the inequality of the strokes without moving the H-shaped levers 86.

In any given change of stroke the compression ratio will be altered automatically, but as stated above it may be desirable to alter this ratio independently of the stroke. This will be possible as already explained by the external controlling means indicated at 100 acting on a collar and fork arrangement 99 (Fig. 7) rod 98 and nut 97 which will make it possible to vary the distance between the piston carrying arm 76 and the slot carrying arm 78.

The combustible mixture may be supplied as indicated to the engine from a carburetor located at the hollow end of the shaft 73 and by radial inlet ducts 115 leading to each cylinder through valves of known type as shown. The timing of the valves may be corrected automatically as described with reference to Figs. 4 and 5.

The embodiment illustrated is given by way of example only and the construction is capable of various modifications without departure from the scope of the invention. It is obvious of course that while the embodiment illustrated shows the cylinders and shaft rotating while one of the gears 103 or 104 is held fast, it would be possible to use the engine with the cylinders and shaft stationary, power being transmitted through a gear such as 103 or 104.

I claim:

1. In a four-cycle rotary internal combustion engine, a cylinder, a piston, a driving shaft, the cylinder being fixedly connected thereto and the piston being pivotally connected thereto, a slide-guide on said connection, a crank-shaft, a connecting rod extending from said crank-shaft to said slide, and an epicyclic gear-system connected to said crank-shaft for moving the end of said connecting rod in said slide, and means connected thereto to vary the amplitude of the successive cycles and to vary the amplitude of the strokes in any one cycle.

2. In a four-cycle rotary internal combustion engine, a cyclinder, a piston, a driving shaft, the cylinder being fixedly connected thereto and the piston being pivotally connected thereto, a slide-guide on said connection, a crank-shaft, a connecting rod extending from said crank-shaft to said slide, and a epicyclic gear-system connected to said crank-shaft for moving the end of said connecting rod in said slide, and means connected thereto to vary the amplitude of the successive cycles and to vary the amplitude of the strokes in any one cycle, said means comprising an eccentric associated with said piston and set to produce said unequal strokes and an angled slot associated with said connecting rod.

3. In a four-cycle rotary internal combustion engine, a piston, a cylinder, a cylinder head, a driving shaft, an arm connecting the piston to the shaft, an internally toothed wheel loosely mounted on said shaft, a pair of other arms loosely mounted on said shaft, a stub shaft supported between said arms, a pinion fixed to said stub shaft, another internally toothed wheel parallel to said first wheel, another pinion fixed on the other end of said stub shaft and meshing with said second wheel, a pinion on the first arm meshing with said first wheel, the axle of said pinion being cranked, a connecting rod connected thereto, another arm loosely mounted on said main shaft and carrying the cylinder head, a slide on said arm for guiding the other end of said connecting rod, and means for applying a differential braking effect to said hypocyclic system to vary the number of explosive impulses per rotation, whereby there is imparted an intermittent motion of greater frequency and lesser amplitude to the piston head, increasing the number of impulses in one rotation of the engine.

4. In a four-cycle rotary internal combustion engine, a piston, a cylinder, a cylinder head, a driving shaft, an arm connecting the piston to the shaft, an internally toothed wheel loosely mounted on said shaft, a pair of other arms loosely mounted on said shaft, a stub shaft supported between said arms, a pinion fixed to said stub shaft, another internally toothed wheel parallel to said first wheel, another pinion fixed on the other end of said stub shaft and meshing with said second wheel, a pinion on the first arm meshing with said first wheel, the axle of said pinion being cramped, a connecting rod connected thereto, another arm loosely mounted on said main shaft and carrying the cylinder head, a slide on said arm for guiding the other end of said connecting rod, a hand wheel on the main shaft having an internally threaded sleeve, a screw loosely mounted on said shaft, and a link connected to said screw by one end thereof and to said connecting rod by the other end thereof.

5. A four-cycle rotary internal combustion engine, comprising a cylinder, a connection between said cylinder and the driving shaft, a piston therein, an arm loosely mounted on said shaft and supporting the piston, a crank shaft supported on said cylinder connecting member, a connecting rod mounted on said shaft and connecting said arm and said crank shaft, and an articulated rod connecting said crank shaft and said arm, the end of said first connecting rod being constrained to rock about a pivot on said arm, and means for raising and lowering said pivot pin to thereby produce a greater or lesser number of reciprocations of said piston, utilizing a greater or lesser part of the explosive force and varying the power output.

6. A four-cycle rotary internal combustion engine, comprising a cylinder, a connection between said cylinder and the driving shaft, a piston therein, an arm loosely mounted on said shaft and supporting the piston, a crank shaft supported on said cylinder connecting member, a connecting rod mounted on said shaft and connecting said arm and said crank shaft, and an articulated rod connecting said crank shaft and said arm, the end of said first connecting rod being constrained to rock about a pivot on said arm, said pivot point being guided in a slot on said arm, said slot having an inclination out of parallel with said arm, whereby raising or lowering the end of said first connecting rod causes the piston range to respectively move away from or towards the cylinder head, thereby producing a change in the volume of the combustion chamber and a change in the compression ratio.

7. A four-cycle rotary internal combustion engine, comprising a cylinder, a connection between said cylinder and the driving shaft, a piston therein, an arm loosely mounted on said shaft and supporting the piston, a crank shaft supported on said cylinder connecting member, a connecting rod mounted on said shaft and connecting said arm and said crank shaft, and an articulated rod connecting said crank shaft and said arm, the end of said first connecting rod being constrained to rock about a pivot on said arm, and means for raising and lowering said pivot pin to thereby produce a greater or lesser number of reciprocations of said piston, utilizing a greater or lesser part of the explosive force and varying the power output, said means comprising pinions of different size fixed to said crank shaft, corresponding pinions loosely supported on the driving shaft, the two sets of pinions constituting epicycloidal trains, and respective braking means for said second pinions for locking same to cause the rate of rotation of said crank shaft to vary, thereby varying the number of reciprocations of said piston per revolution of the driving shaft.

8. In an engine of the type described, a cheek connecting the cylinder to the main shaft, a cam shaft rotatably supported thereon, a pinion keyed to said shaft, a crank shaft supported in said cheek, a pinion fixed thereon and meshing with said first pinion, and a contact breaker on said cam shaft.

9. In an engine of the type described, a cheek connecting the cylinder to the main shaft, a cam shaft rotatably supported thereon, a pinion keyed to said shaft, a crank shaft supported in said cheek, a pinion fixed thereon and meshing with said first pinion, an inlet and exhaust valve-cam on said cam shaft, a rocker for the inlet and exhaust valve system on the cylinder head, a lever on said cam shaft, a spindle carried thereby, a roller-carrying lever pivoted about said spindle, said roller operating said rocker, a lever projecting from said crank shaft, a lug thereon adapted to actuate said first lever, whereby a variation in the timing of the valves may be effected to increase or reduce the speed of operation of the engine without manipulating the throttle.

In testimony whereof I have signed my name to this specification.

GEORGES E. EZBELENT.